Jan. 3, 1967   A. L. HOLZMAN   3,295,323
MEANS FOR VAPORIZING LIQUID PROPELLANTS
Filed Feb. 24, 1965

INVENTOR.
ALLEN L. HOLZMAN
BY C. E. Vautrain Jr. AGENT
Q. Baxter Warren
ATTORNEY

United States Patent Office 3,295,323
Patented Jan. 3, 1967

3,295,323
MEANS FOR VAPORIZING LIQUID PROPELLANTS
Allen L. Holzman, Palo Alto, Calif., assignor, by mesne assignments, to the United States of America as represented by the Secretary of the Navy
Filed Feb. 24, 1965, Ser. No. 435,098
10 Claims. (Cl. 60—251)

The present invention relates in general to hybrid rocket systems using non-hypergolic compositions, and more particularly to a method and means for vaporizing the liquid propellant of such systems before it enters the combustion area thereof.

It has been determined in the use of hybrid combustion chambers that non-hypergolic hybrid systems can encounter flooding problems not unlike those encountered in chemical reactor systems in that combustion of a peripherally disposed solid propellant will be supported only at the periphery of the liquid streams injected into the cavity in the solid propellant. Such combustion occurs only where there is vapor present and thus where liquid oxygen or liquid propellant is introduced axially into the casing and within the periphery of the solid propellant only the portion of the liquid propellant which is vaporized is effective in providing combustion of the solid propellant. Previously, efforts at reducing the amount of non-vaporized liquid propellant within the perimeter of the solid propellant appear to have been centered on conducting the liquid propellant thru coils or tubing disposed around the rocket casing. The present invention avoids the disadvantages of such tubing by placing the regenerative heating tubing within or at least partially within the core of the solid propellant.

Accordingly, it is an object of the present invention to provide regenerative heating means for a hybrid rocket system wherein the heating means are disposed internally with respect to the rocket engine.

It is another object of the present invention to position regenerative heating tubing in such a manner that the internally radiated heat of combustion is used to effect vaporization.

It is a still further object of the present invention to provide a regenerative heating method and means for vaporizing liquid propellant in a hybrid rocket system wherein the means are disposed in a portion of the combustion chamber where there is little or no danger of damage from the heat of combustion.

Figure 1:
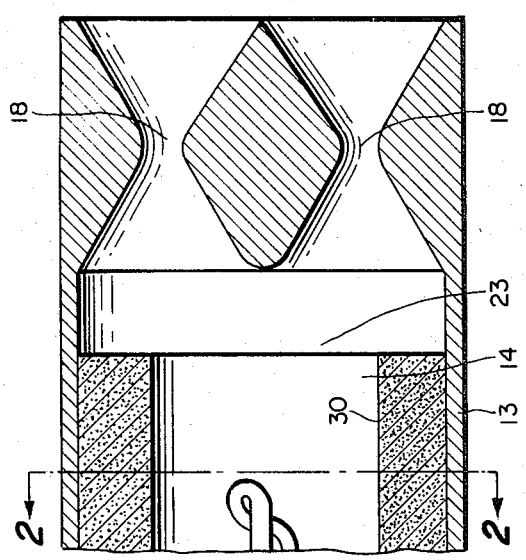
Figure 2:
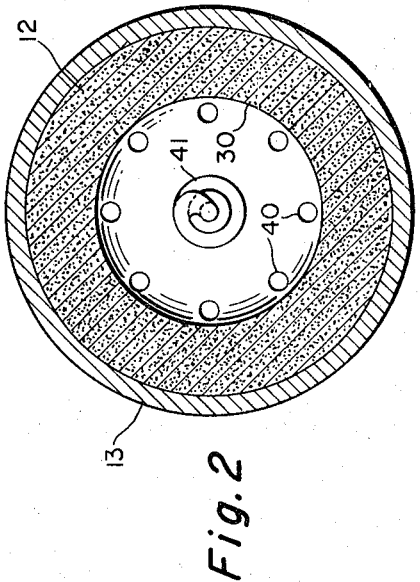

Other objects and many of the attendant advantages of this invention will be readily appreciated as the same becomes better understood by reference to the following detailed description when considered in connection with the accompanying drawing in which like numerals designate like parts throughout and wherein:

FIG. 1 is a longitudinal cross section partially in elevation of a hybrid rocket engine incorporating the system of the present invention; and FIG. 2 is a cross-section of the embodiment of FIG. 1 taken along a line substantially corresponding to line 2—2.

Referring now to the drawings in detail, FIG. 1 illustrates a hybrid rocket system including a rocket engine 11 containing an elongated hollow grain of solid propellant 12 disposed within the rocket engine casing 13.

The solid propellant grain 12 has a longitudinal central opening 14 which communicates at the exhaust end with a plurality of rocket propulsion nozzles 18. Chamber 20 at the opposite end of the motor is provided with means for the introduction of vaporized liquid propellant into the engine. The combustion chamber of the rocket engine is generally indicated at 23.

Liquid propellant in the present embodiment is contained in a supply tank 25 which is disposed forward of the rocket engine, the tank 25 communicating with chamber 20 by distributing lines connected thereto which are generaly indicated at 27. The liquid propellant distribution and vaporization system 27 may be any of several modifications, an important feature thereof being the portion extending within casing 13.

In FIGS. 1 and 2, the solid propellant is shown having an annular inner surface 30, however, it will be appreciated that a star-shaped opening or other regular configuration which provides a central core may also be used within the inventive concept. The tank 25 may contain liquid oxygen or other liquid fuel and may be connected to a passage such as tubing 31 in which is disposed a valve 33 for controlling the rate of flow. Tubing 31 may extend through the forward end of the hybrid rocket engine as indicated at 34 and through chamber 20 so as to be axially disposed at least partially within the core 14 of solid propellant 12. Tubing 31 may then double back to exit casing 13 at a point near its entrance at 34 and may include a valve 36 to provide for further flow control as well as means for bypassing or dumping liquid propellant when essential. From valve 36 the tubing may be connected to a distributing system such as an annular manifold 37. Inlets or injectors 40 are formed in the forward end of the rocket engine to permit the vaporized gases to be introduced into chamber 20. These injectors are shown in FIG. 2 to be concentrically spaced about the engine opposite the inner periphery of the propellant, however, it will be appreciated that the injectors may be varied in number and in position to correspond to respective openings in the propellant such as star-shaped or fluted or corrugated, etc. Tubing 31, which is in effect a regenerative heater in the portion indicated at 41, is centrally disposed in the rocket engine which disposition provides a use of the ordinarily liquid enriched center core 14 as a region for the vaporization of the liquid propellant. Controls for valves 33 and 36 are indicated at 42.

The present regenerative heater system insures that only gaseous propellant is introduced into chamber 20 and core 14 and through this feature provides a much more uniform regression of the solid propellant fuel surface since all or virtually all of the inner surface of solid propellant 12 will be exposed to vaporized propellant in lieu of only a portion of such surface being exposed to liquid propellant as in prior hybrid systems. That is, in engines where liquid propellant is injected in liquid form into the solid propellant core it will be appreciated that although combustion may take place on the inner surface of the after portion of the solid propellant where the liquid propellant would be in the form of vapor, such combustion may not take place at the forward portion of the core where the liquid propellant is still in liquid form and thereby inhibits combustion. Thus, in those systems where liquid propellant is introduced directly into the solid propellant core the after end of the solid propellant will burn in advance of the forward end and a less efficient operation will be obtained. More uniform regression of the solid propellant fuel surface obtained by the use of the present invention is therefore accomplished by removing any required chamber length during which oxidization or vaporization of the liquid propellant is to or may take place.

Having regenerative heater 41 disposed in at least a portion of the central core of solid propellant 12 places the heater tubing in a relatively low temperature portion of the engine in relation to the combustion temperature. Where flow of gas is normal, the centrally disposed tubing should have no effect on engine operation. A major obstruction, namely the inner portions of nozzles 18, positioned downstream of the solid propellant grain can cause the vaporized liquid propellant in the center of the core of the solid propellant to mix with the fuel-rich annular stream and increase performance and temperature. Such an annular stream may be obtained by having injectors 40 through which vaporized liquid propellant is introduced into the solid propellant chamber positioned as shown in FIG. 2 although it will be appreciated that other positions nearer to the center of the core and more or less in number would have a similar effect.

An example of a hybrid system using the teachings of the present invention would be one in which the liquid propellant is liquid oxygen and polymethyl methacrylate. In any liquid oxygen system, the initial oxidizer traversing tubing 31 and regenerative heater 41 is varporized into a gaseous phase due to the residual heat in the hardware of the tubing and the substantial cooling of such hardware which is necessary before the vaporizing effect may be overcome. Some initial liquid oxygen may be ignited by an auxiliary ignition source, such ignition serving to start combustion with the methacrylate mixed with the liquid oxygen. By having the liquid propellant feed line disposed in the center core of the combustion chamber before the oxygen reaches the injector inlets, it can be appreciated that all of the oxygen will exit the injectors 40 as gas. Since center core 14 is at a lower temperature than the combustion temperature, and at a much lower temperature than the melting point of the regenerative heater tubing, there should be no need to protect the regenerative heater feedlines from burning out.

Having a dual valve arrangement upstream of the vaporation lines, that is between the liquid propellant supply tank and the centrally disposed tubing, and also between the regenerative heater and the injectors serves to insure proper flow of vaporized liquid propellant when desired. The valve 36 could be a three-way valve so as to both control flow when desired or to dump the liquid propellant in the tubing when the occasion calls for such action.

It will thus be appreciated that the present invention sets forth a method and means for insuring that only vaporized liquid propellant is injected into a rocket engine and accomplishing this purpose with a minimum of hardware.

It will be recognized that many modifications and variations of the present invention are possible in the light of the above teachings. It is therefore to be understood that within the scope of the appended claims the invention may be practiced otherwise then as specifically described.

I claim:
1. In a hybrid rocket engine having an annularly disposed solid propellant, a source of liquid propellant, a combustion chamber and an exhaust nozzle the combination comprising:
said combustion chamber containing said solid propellant and having injectors for entry of said liquid propellant;
conduit means disposed within the annulus of the solid propellant for conducting said liquid propellant from the source of supply thereof to the forward end of the solid propellant;
said solid propellant selectively spaced from said conduit means; and
injector means disposed at the forward end of the combustion chamber and connected to said conduit means for injecting vaporized liquid propellant into said combustion chamber,
whereby said liquid propellant is vaporized in said conduit means and a more uniform regression of the burning surface of said solid propellant is obtained.
2. The combination as defined in claim 1 wherein said conduit means is axially disposed in at least the forward portion of the combustion chamber.
3. The combination as defined in claim 2 wherein the liquid propellant is liquid oxygen.

4. The combination as defined in claim 2 wherein said conduit means includes a substantially straight inlet portion within said chamber and a return portion disposed around a substantial portion of the inlet portion,
whereby liquid propellant first traverses a conduit spaced a greater distance from the solid propellant and then traverses an outlet portion spaced a lesser distance from the solid propellant.
5. The method of providing regenerative heating in a hybrid rocket engine comprising the steps of:
disposing solid propellant about the inner wall of the engine casing so as to leave an axially extending cavity in the propellant;
providing a centrally disposed conduit in the axially extending cavity for conducting liquid propellant through a portion of the cavity; and
injecting the liquid propellant into the cavity forwardly of the solid propellant after it traverses the conduit,
whereby the ambient temperature of the conduit will vaporize the liquid propellant initially introduced therethrough and thereafter the heat of combustion of the solid propellant will vaporize subsequent liquid propellant traversing the conduit.
6. A rocket engine comprising:
a solid propellant disposed in the casing of said engine so as to form an axial cavity therein;
regenerative heating tubing disposed axially in the casing of said engine;
said tubing extending from the forward end of said cavity at least a substantial distance into said cavity;
said tubing having an inlet portion and outlet portion with the outlet portion including a return passage disposed adjacent the inlet portion in said cavity and extending through the central portion of the forward end of the engine casing;
control means disposed intermediate the supply of liquid propellant and said inlet portion for controlling the flow of liquid propellant;
injector means centrally disposed in the forward end of said engine and connected to the outlet portion of said tubing; and
valve means disposed intermediate the outlet portion of said tubing and said injector means to permit dumping of liquid propellant when desired,
whereby upon starting of said engine the ambient temperature of said tubing will vaporize the liquid propellant initially entering said tubing and thereafter the heat of combustion of said engine will vaporize subsequent liquid propellant traversing said tubing.
7. The device as defined in claim 6 wherein said injector means includes a manifold centrally disposed on the outer forward portion of the engine casing; and
a plurality of ducts extending axially from said manifold into the interior of said casing.
8. The device as defined in claim 7 wherein said ducts are symmetrically disposed about said tubing.
9. The device as defined in claim 8 wherein said ducts parallel the centerline of said engine and are confined within a circle having a radius not less than the distance of the innermost portion of said solid propellant from the centerline of said engine.
10. The device as defined in claim 9 wherein said liquid propellant is liquid oxygen.

References Cited by the Examiner
UNITED STATES PATENTS

| | | | |
|---|---|---|---|
| 3,017,748 | 1/1962 | Burnside | 60—35.6 |
| 3,144,751 | 8/1964 | Blackman et al. | 60—35.6 |
| 3,173,251 | 3/1965 | Allen et al. | 60—35.6 |
| 3,214,906 | 11/1965 | Coleal | 60—35.6 |

CARLTON R. CROYLE, *Primary Examiner.*